US012239946B2

(12) United States Patent
LaRose et al.

(10) Patent No.: US 12,239,946 B2
(45) **Date of Patent: *Mar. 4, 2025**

(54) MIXING CUP WITH EXTRUSION PLUNGER

(71) Applicant: FlackTek SpeedMixer, Inc., Landrum, SC (US)

(72) Inventors: Ian Thomas LaRose, Greenville, SC (US); Matthew L. Gross, Boulder, CO (US); David Gale, Kennesaw, GA (US)

(73) Assignee: FlackTek SpeedMixer, Inc., Landrum, SC (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/839,765

(22) Filed: Jun. 14, 2022

(65) Prior Publication Data

US 2022/0305451 A1 Sep. 29, 2022

Related U.S. Application Data

(63) Continuation of application No. 16/448,767, filed on Jun. 21, 2019, now Pat. No. 11,383,212.

(60) Provisional application No. 62/687,972, filed on Jun. 21, 2018.

(51) Int. Cl.

| | |
|---|---|
| ***B01F 35/00*** | (2022.01) |
| ***B01F 27/808*** | (2022.01) |
| ***B01F 29/00*** | (2022.01) |
| ***B01F 35/75*** | (2022.01) |
| *B01F 35/45* | (2022.01) |
| *B01F 35/50* | (2022.01) |

(52) U.S. Cl.

CPC ...... *B01F 35/75425* (2022.01); *B01F 27/808* (2022.01); *B01F 29/4011* (2022.01); *B01F 29/40221* (2022.01); *B01F 35/4521* (2022.01); *B01F 35/54* (2022.01)

(58) Field of Classification Search

CPC .............................. B01F 35/54; B01F 35/4521

See application file for complete search history.

(56) References Cited

U.S. PATENT DOCUMENTS

| | | | | | |
|---|---|---|---|---|---|
| 5,352,037 | A | 10/1994 | Jouvin | | |
| 6,099,160 | A * | 8/2000 | Flackett | B01F 35/50 | 366/217 |
| 6,755,565 | B2 | 6/2004 | Flackett | | |
| 11,383,212 | B2 * | 7/2022 | LaRose | B01F 27/808 | |
| 2005/0105385 | A1 * | 5/2005 | McGill | B01F 35/713 | 366/139 |

* cited by examiner

*Primary Examiner* — Anshu Bhatia

(74) *Attorney, Agent, or Firm* — Berg Hill Greenleaf Ruscitti LLP

(57) ABSTRACT

A device for mixing and dispensing a flowable material or mixture of materials, the device comprising a cup having a bottom with a protrusion having an opening; a plunger having a dispensing port and air vent holes; a plug; a nozzle; and, a lid. The plug can be associated with and plug the cup protrusion opening when the cup is being filled or mixed, or the plug can be associated with the plunger port to seal off the air vent holes when material is dispensed from the device. Also disclosed is a method of mixing and dispensing a flowable material.

18 Claims, 22 Drawing Sheets

PRIOR ART

MIXING CUP WITH EXTRUSION PLUNGER

CROSS-REFERENCE TO RELATED APPLICATION

This application is a continuation of U.S. application Ser. No. 16/448,767, filed Jun. 21, 2019; claims the benefit of and priority to U.S. Provisional Application No. 62/687,972, filed Jun. 21, 2018. The entire specification and figures of the above-referenced application are hereby incorporated, in their entirety by reference.

FIELD

The present disclosure relates generally to devices and methods of mixing. More specifically, the present disclosure relates to devices and methods for mixing fluids, semi-fluids, gels, particles, powders, and other flowable material.

BACKGROUND

Flowable materials, such as, but not limited, to creams and medicines, are often a mixture of several components. Frequently, the components need to be mixed in a high speed mixer in order to create a homogenous mixer. Typically, the components to be mixed are added to a mixing container which is inserted into mechanical mixer. After mixing the container is removed from the mixer and the contents transferred to an intermediary dispensing device which dispenses a quantity of the contents into a number of containers intended to be provided to patients. A problem with using an intermediary dispensing device is that a small residual portion of the contents of the initial mixing container are not transferred to the dispensing device and are left on the walls or the bottom of the mixing container It would be desirable to have a mixing container that would, after the contents are mixed therein by the mixer, permit controlled dispensing of the contents directly from the container without requiring transfer to an intermediary dispensing device. Such a device would improve the efficiency and thoroughness of the materials transfer.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In exemplary embodiments, a device is provided for mixing and dispensing a flowable material or mixture of materials, the device comprising a cup, a plunger, a plug, a nozzle, and a lid. In exemplary embodiments, the cup may comprise a generally cylindrical mixing cup comprising a bottom having a protrusion extending downward therefrom, the protrusion having an aperture defined therethrough, a sidewall, a rim, wherein the sidewall has an interior wall surface and an exterior wall surface, a portion of the exterior wall surface having threads associated therewith. In exemplary embodiments, the plunger is generally cylindrically shaped and adapted to snugly fit at least partially within the mixing cup, the plunger comprising a bottom having at least one reinforcing strut. In exemplary embodiments, the port is associated with or formed in the plunger bottom and has a threaded aperture defined therein, at least one air vent hole defined in the port, and, a sidewall with an exterior surface having an upper sealing member portion adapted to engage the mixing cup sidewall, and a lower sealing member portion adapted to engage the mixing cup sidewall. In exemplary embodiments, the plug has an outer cylindrical portion having an exterior wall including threads, an interior wall including threads, and a central plugging member, the plug adapted to removably engage either the mixing cup protrusion or the plunger port. In exemplary embodiments, the nozzle is hollow and has a proximal end having internal threads adapted to engage with the plunger port, has a distal end. In exemplary embodiments, the lid has interior threads adapted to removably engage the cup rim. In exemplary embodiments, the device may also optionally include a cap adapted to removably fit over the distal end of the nozzle.

An apparatus for mixing and dispensing flowable material is provided, comprising a mixer and a cup device as described.

BRIEF DESCRIPTION OF THE DRAWINGS

The drawings disclose exemplary embodiments in which like reference characters designate the same or similar parts throughout the figures of which.

DETAILED DESCRIPTION

Unless otherwise indicated, the drawings are intended to be read (for example, cross-hatching, arrangement of parts, proportion, degree, or the like) together with the specification, and are to be considered a portion of the entire written description of this invention. As used in the following description, the terms "horizontal", "vertical", "left", "right", "up" and "down", "upper" and "lower" as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Dynamic mixing, such as rotation mixing, can provide effective, non-invasive mixing of flowable materials 10. Dual asymmetric rotation mixing can be particularly fast and effective by imposing centrifugal forces on the substance(s) to be mixed. Various containers can be selected for containing the material(s) to be mixed and undergoing the dual asymmetric rotation. Materials that can be mixed using the presently disclosed invention include, but are not limited to, fluids, semi-fluids, suspensions, colloids, gels, pastes, articles, granules, powders, other flowable material, and mixtures or combinations of at least two of the foregoing. Examples of materials that can be mixed include, but are not limited to, creams to be mixed and formulated with medicinal material, as well as epoxies, inks, adhesives, sealants, coatings, and the like.

Figure 1:
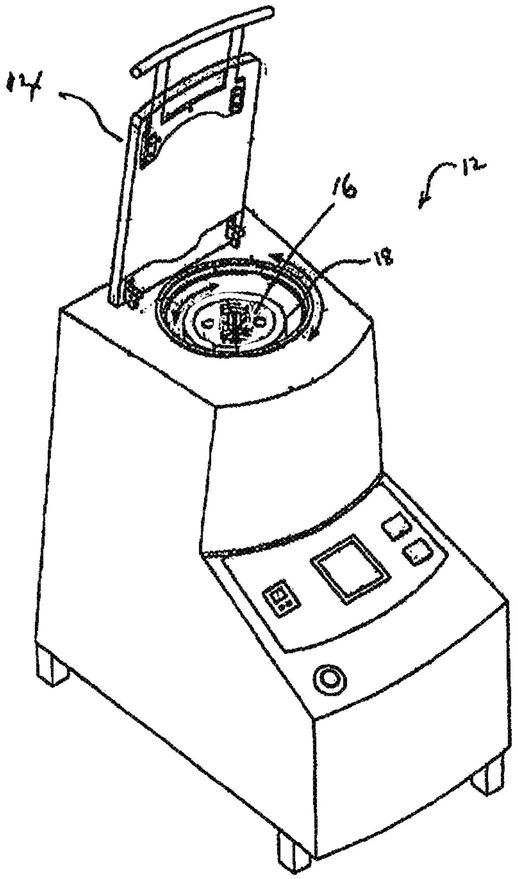
FIG. 1 (labeled Prior Art) is a perspective view of a commercially available dual asymmetric rotation mixer including a chamber for holding a mixing device according to the present disclosure.

FIG. 1 (labeled Prior Art) shows a conventional dual asymmetric rotation mixer 12 (such as the SPEEDMIXER™ available from Flacktek, Inc., Landrum, South Carolina) having its hatch (door) 14 open to reveal a mixing chamber 16 for conducting dual asymmetric rotation mixing. The chamber 16 can receive a mixing container 18 (shown in dashed lines) that contains one or more substances for rotational mixing. The mixing container 18 can be engaged with a rotation drive (not shown) of the mixer 12 that imposes rotational forces on the mixing container 18 engaged with the chamber 16. It is to be understood that other types of mixers other than a dual asymmetric rotation mixer can be used with the mixing container of the present disclosure.

Examples of suitable rotational mixers 12 can be found in U.S. Pat. Nos. 6,099,160 and 6,755,565, the disclosures of each of which are incorporated by reference, including, but not limited to, those portions disclosing devices, systems, and methods for mixing and associated components and accessories. Such dual axis rotation mixing including dual asymmetric rotation may be referred to as planetary mixing and/or centrifugal mixing, although these terms may not be entirely accurate and are not intended to limit mixing parameters such as the direction of rotation about each of the dual axes, speed, and/or other geometry relationships.

Figure 2:
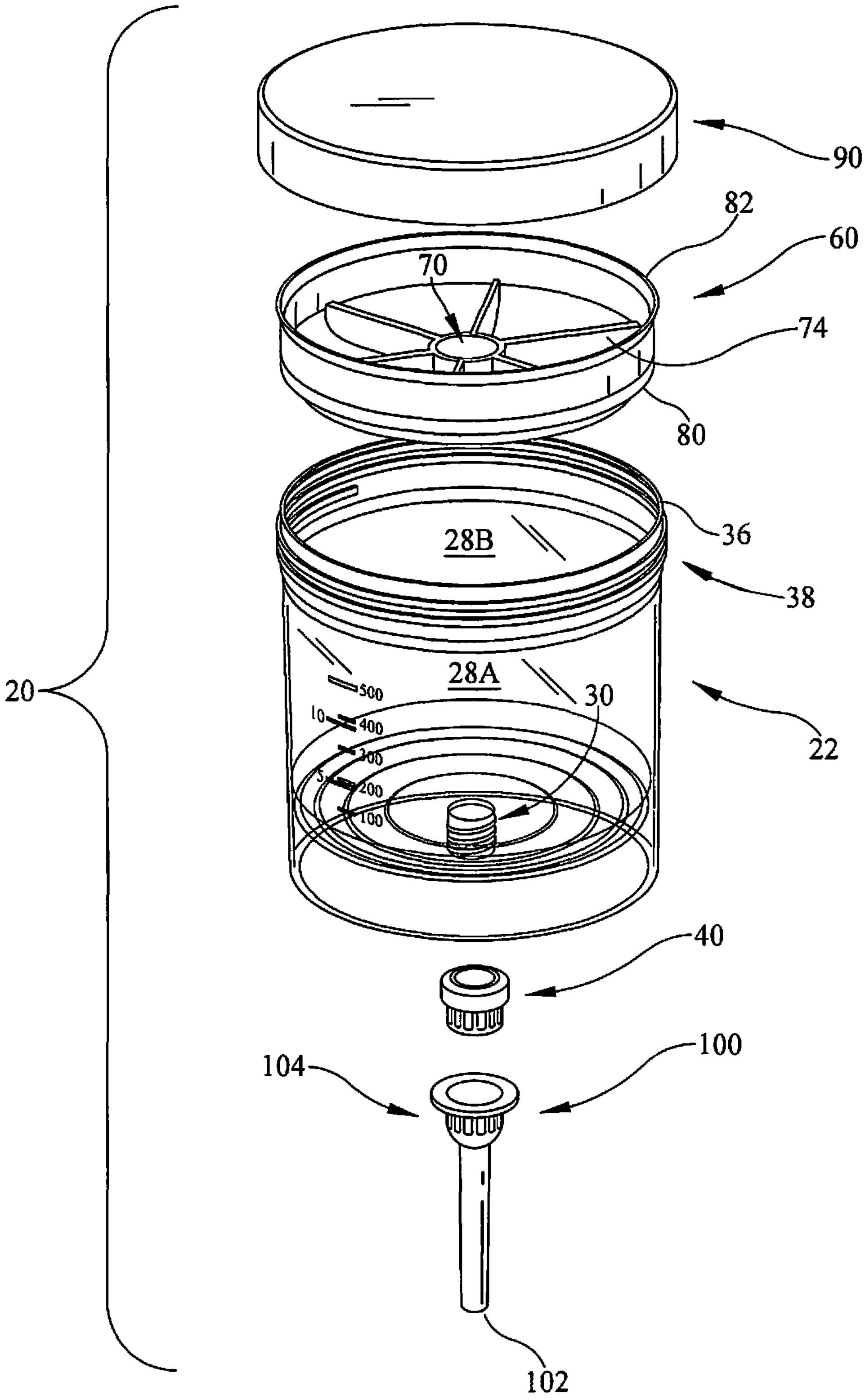
FIG. 2 is an exploded perspective view of a device according to one exemplary embodiment, also including an optional lid.

FIGS. 2-11 show one exemplary embodiment of a device 20 for mixing dispensing a flowable material 21, generally comprising a mixing cup 22, a plunger, and a nozzle. FIG. 2 shows an exploded view of components of one exemplary embodiment of a device 20

Figure 3:
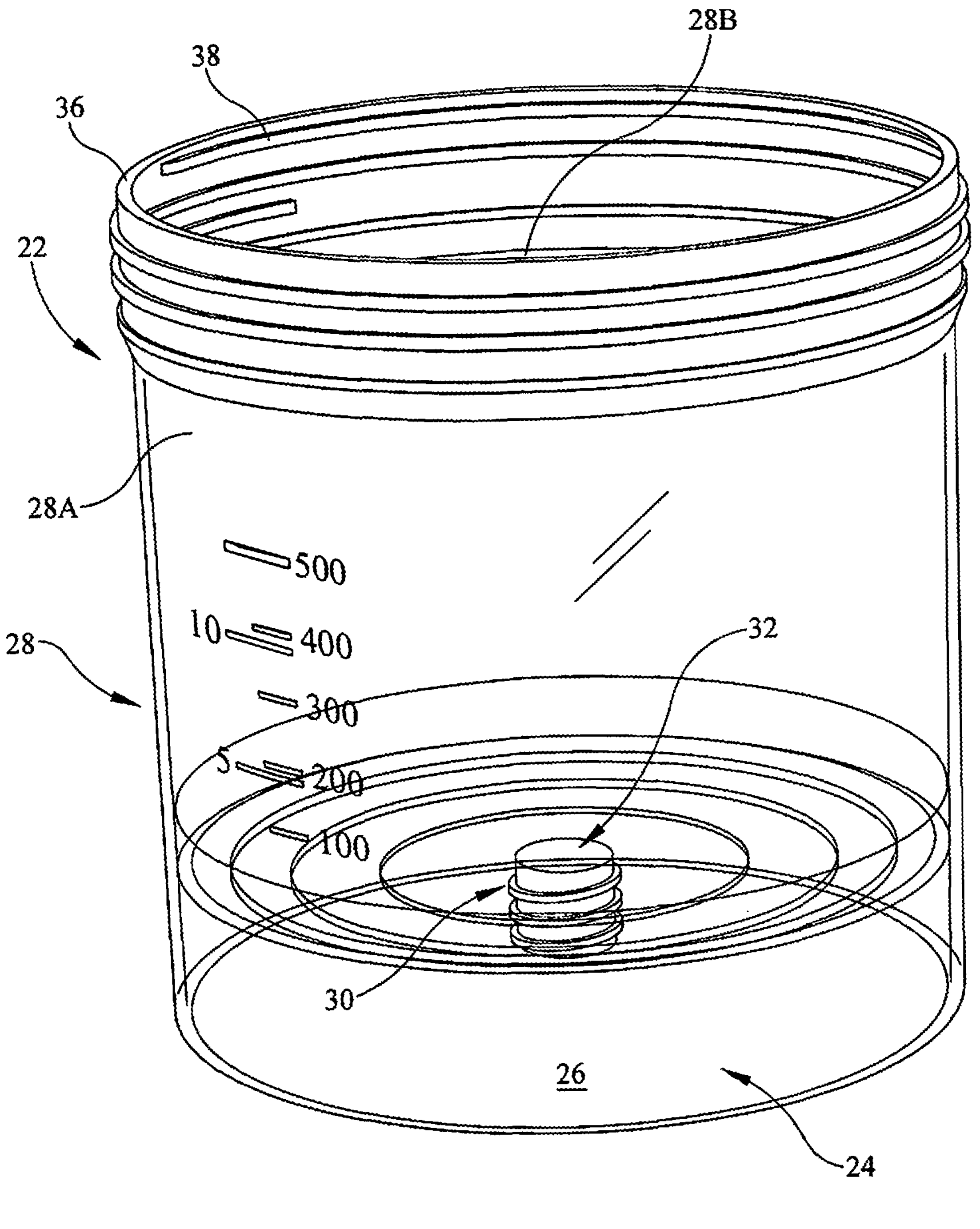
FIG. 3 is a side perspective view of a mixing cup according to one exemplary embodiment.

FIG. 3 shows an exemplary embodiment of a mixing cup 22 having a bottom 24, interior bottom surface 26, side 28, and rim 30. In exemplary embodiments, the rim 30 may have threads 32 formed therein (illustratively shown on the outside wall 28A of the side 28, but which alternatively could be on the inside wall 28B of the side 28). In exemplary embodiments, the cup bottom 24 may be flat, or it may be curved, such as concave-curved. In one exemplary embodiment, shown in FIGS. 10 and 15, the cup bottom 24 has a convex curve from the outside edge toward the center, with area proximate to the center being concave shaped. The cup bottom 24 has a hollow protrusion 30 with an aperture 32 formed therein. In exemplary embodiments the aperture 32. In exemplary embodiment at least a portion of the outer surface of the protrusion 30 has threads 34. In exemplary embodiments, the aperture 32 and threads 34 can be sized to match existing national pipe thread NTP standard sizes for fitting to conventional nozzles or other devices (such as, but not limited to, tubes, couplings, or the like). In exemplary embodiments, the cup 22 may have indicia associated therewith, such as, but not limited to fill-indicator lines formed in or printed on the exterior wall. The cup 22 has a rim 36. In exemplary embodiments, the rim 36 may have external threads 38.

In exemplary embodiments, the cup 22 is formed of plastic. In exemplary embodiments, the cup 22 may be made of any generally rigid and inert material that is able to withstand the rotational forces during mixing, for example, polypropylene, polyethylene, polystyrene, polyurethane, tin, aluminum, steel, silicon dioxide, mixtures and combinations of the foregoing, and the like. In exemplary embodiments, the volume of substance within the cup 22 may be within a range of about 0.1 ml to about 20,000 ml, depending on the size of the cup 22 and other components, and the size of the mixer.

Figure 4A:
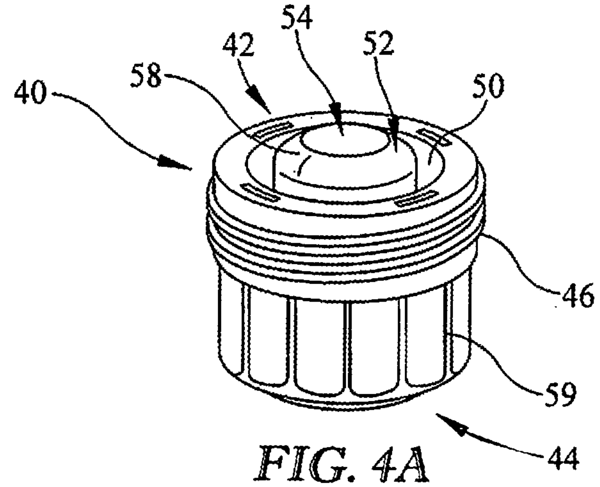
FIG. 4A is a top perspective view of a plug according to one exemplary embodiment.
Figure 4B:
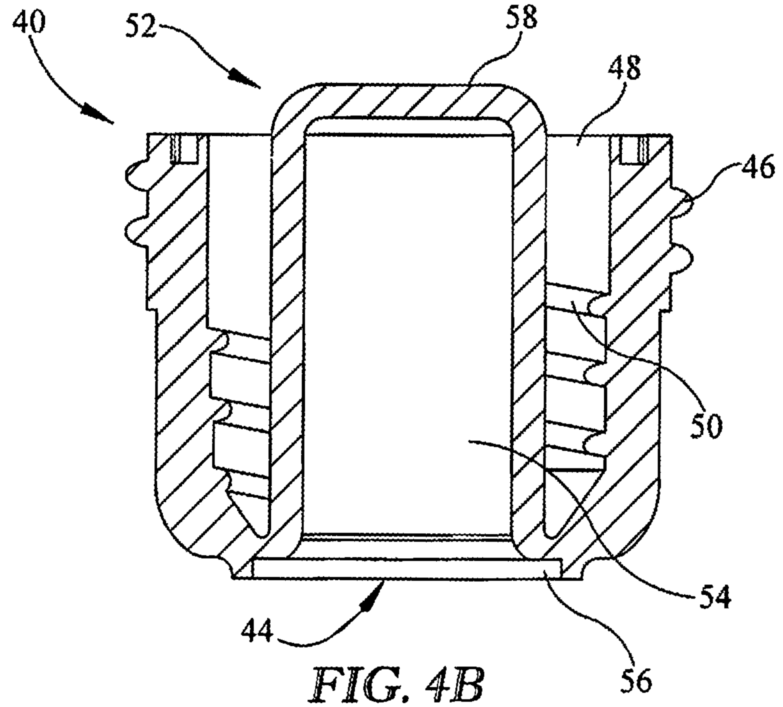
FIG. 4B is a side cross-sectional view of the plug of FIG. 4A.
Figure 4C:
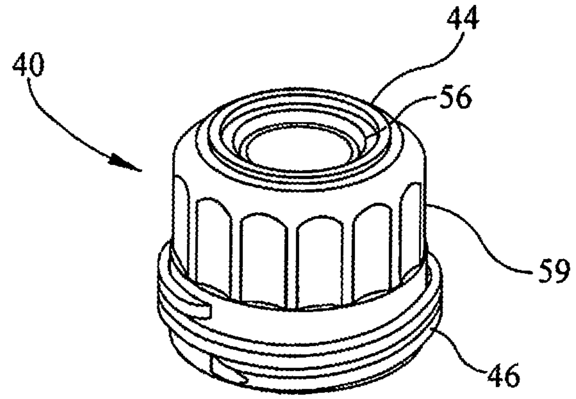
FIG. 4C is a bottom perspective view of the plug of FIG. 4A.
Figure 5:
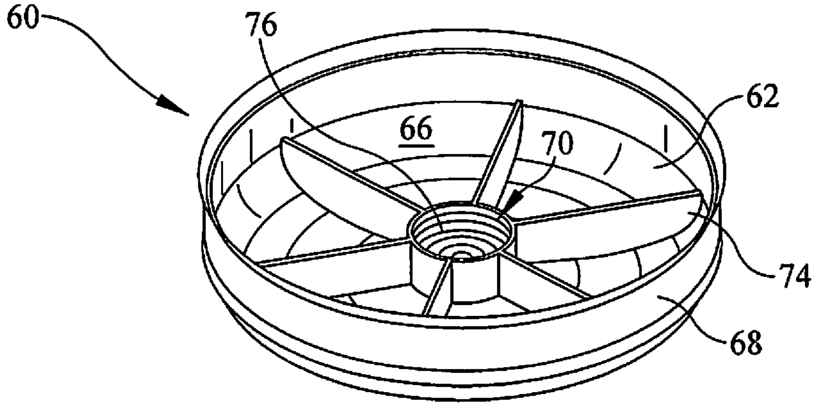
FIG. 5 is a top perspective view of a plunger according to one exemplary embodiment.
Figure 6:
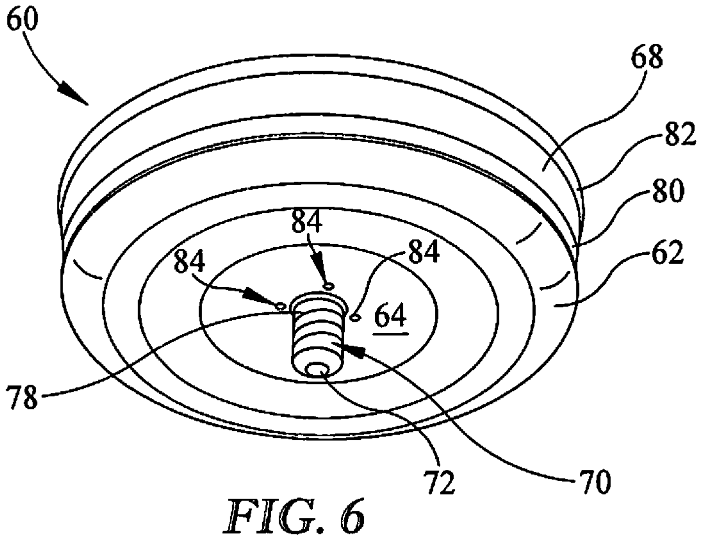
FIG. 6 is a bottom perspective view of the plunger of FIG. 5.
Figure 7:
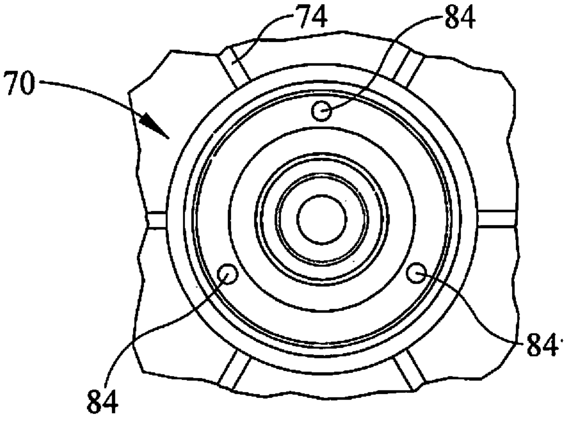
FIG. 7 is a detail view of a portion of the plunger of FIG. 5, further showing air vent holes.
Figure 8:
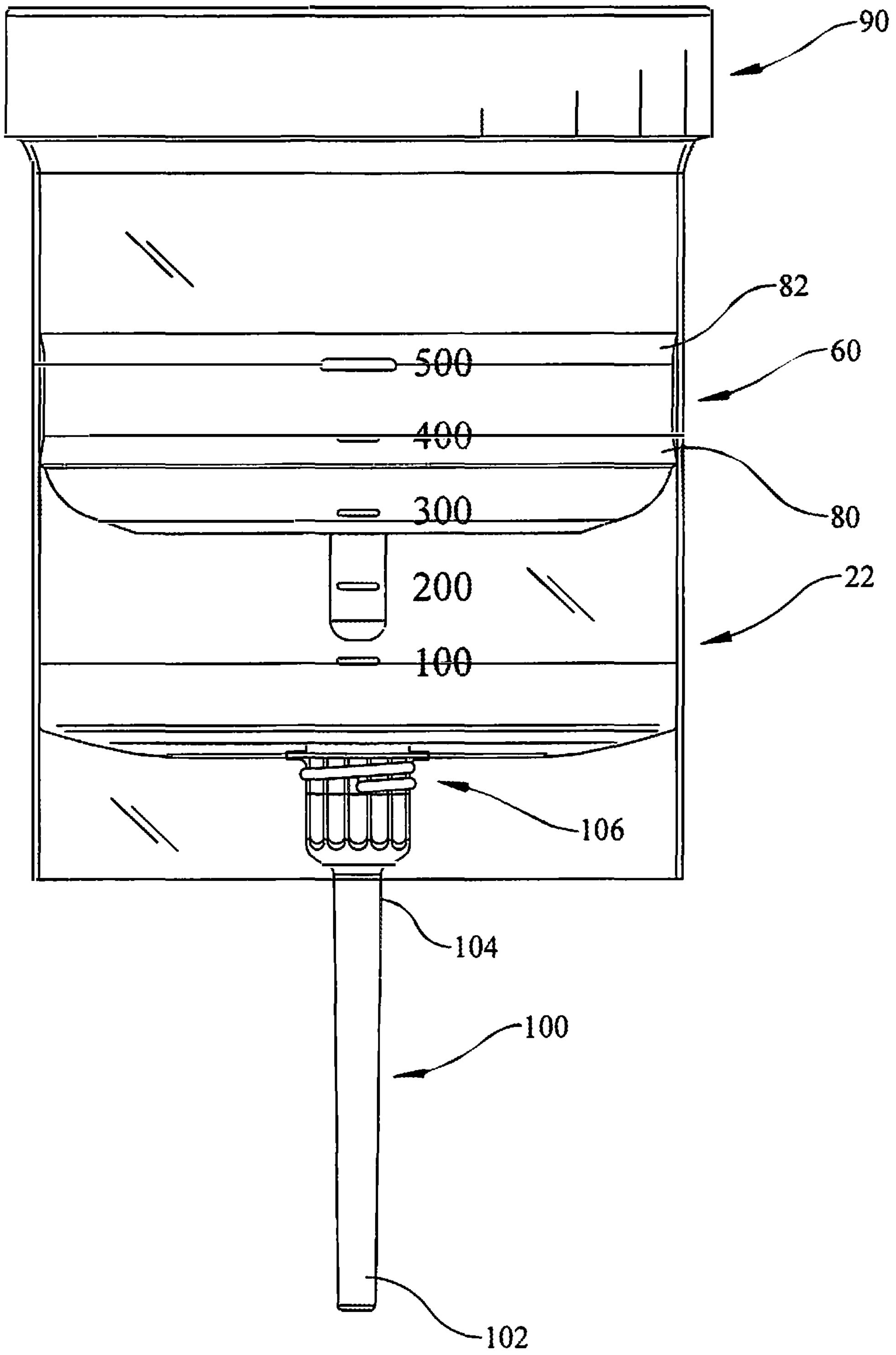
FIG. 8 is a side perspective view of a cup (shown as transparent), lid, plunger, and nozzle according to one exemplary embodiment.
Figure 18:
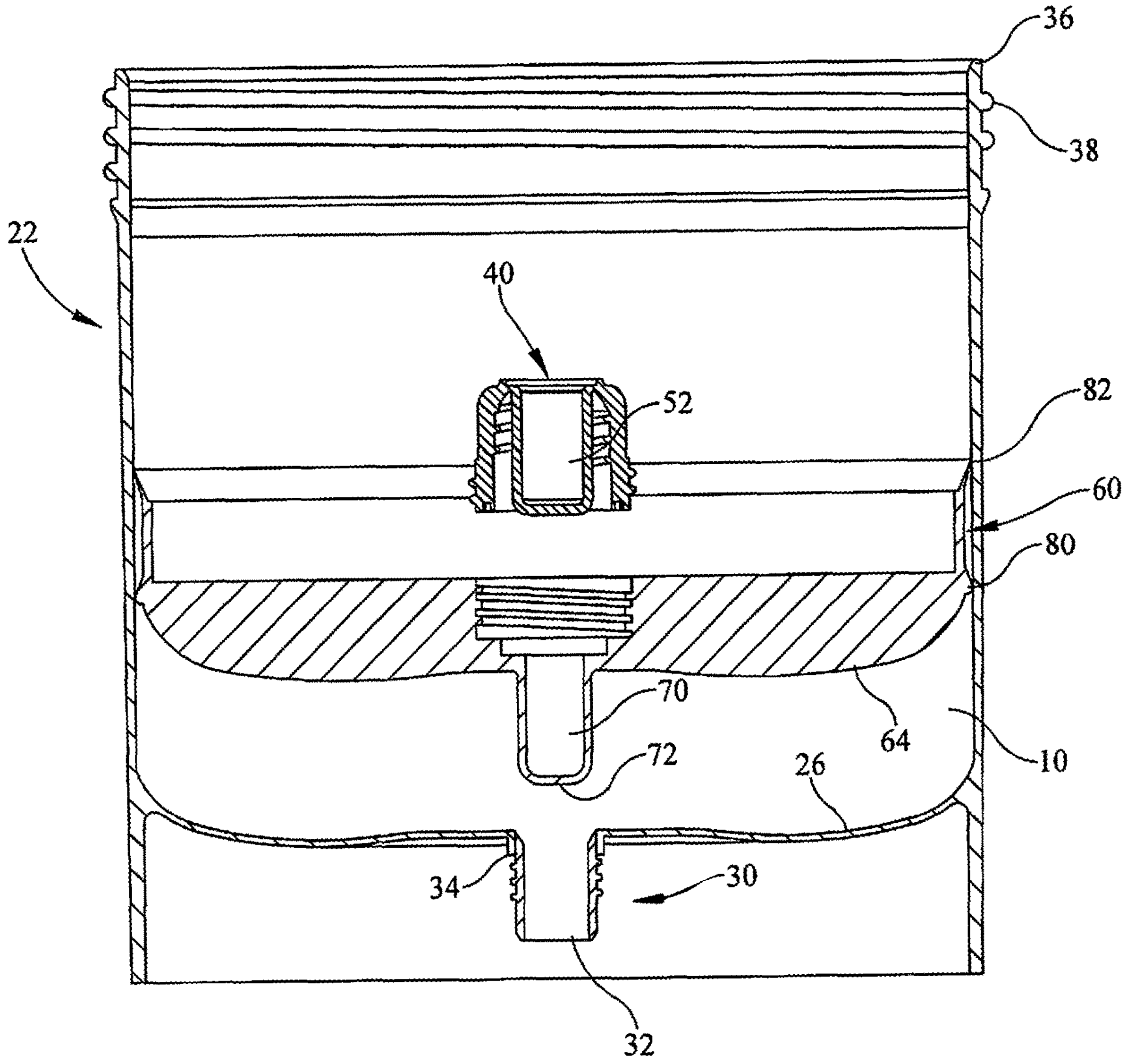
FIG. 18 is a side cutaway view of a cup and plunger, showing the plug positioned above the plunger port.

In exemplary embodiments, a cup plug 40 as shown in FIGS. 4A-C, is adapted to fit at least partially within the aperture 32 (as shown in FIG. 18). In exemplary embodiments, the plug 40 has a top end 42 and a bottom end 44. In exemplary embodiments, the plug 40 has an exterior thread 46 which can mate with the aperture threads 34. In alternative exemplary embodiments, the plug 40, made without exterior threads 34, and can be inserted in the aperture 32 (also without threads in such embodiments) and maintained by friction fit or snap fit. In exemplary embodiments, the plug 40 has a nipple portion 52 associated with the bottom end 44 of the plug 40. In exemplary embodiments, the nipple portion 52 may have a hollow bore portion 54 that is open at a proximal end 56 and closed at a distal end 58. In exemplary embodiments, the distal end 58 of the nipple portion 52 may extend beyond the top of the plug 40. In exemplary embodiments, the plug 40 may have ridges 59 or other surface protrusion or depression to facilitate gripping.

In exemplary embodiments, the plug 40 can removably be associated with the cup bottom protrusion 30, such as by screwing into the aperture 32 (as show in FIG. 11) or by a friction or snap fit. The plug 40 can also be removably associated with the plunger port, as described hereinbelow.

As shown in FIGS. 5-10, a plunger 60 comprises a bottom 62 having an external surface face 64 (which contacts material 10), an internal surface 66, a sidewall 68, a central protruding port 70 having an opening 72, and, in exemplary embodiments, one or more struts 74 or other support structures to maintain the port 70 in position (and to provide support to the contact face). In exemplary embodiments, the port 70 has interior threads 76 (to which can mate the exterior threads 46 of the plug) and exterior threads 78 (which can be mated to the cup threads 38). In exemplary embodiments, the plunger 60 has a generally circular circumference. In exemplary embodiments, the sidewall 68 has a lower sealing member 80 extending generally outward. In exemplary embodiments, the sidewall 68 has a upper sealing member 82 extending generally outward. In exemplary embodiments, the plunger has both first and second sealing members 80 and 82. In alternative embodiments, more than two sealing members can be utilized.

Figure 17:
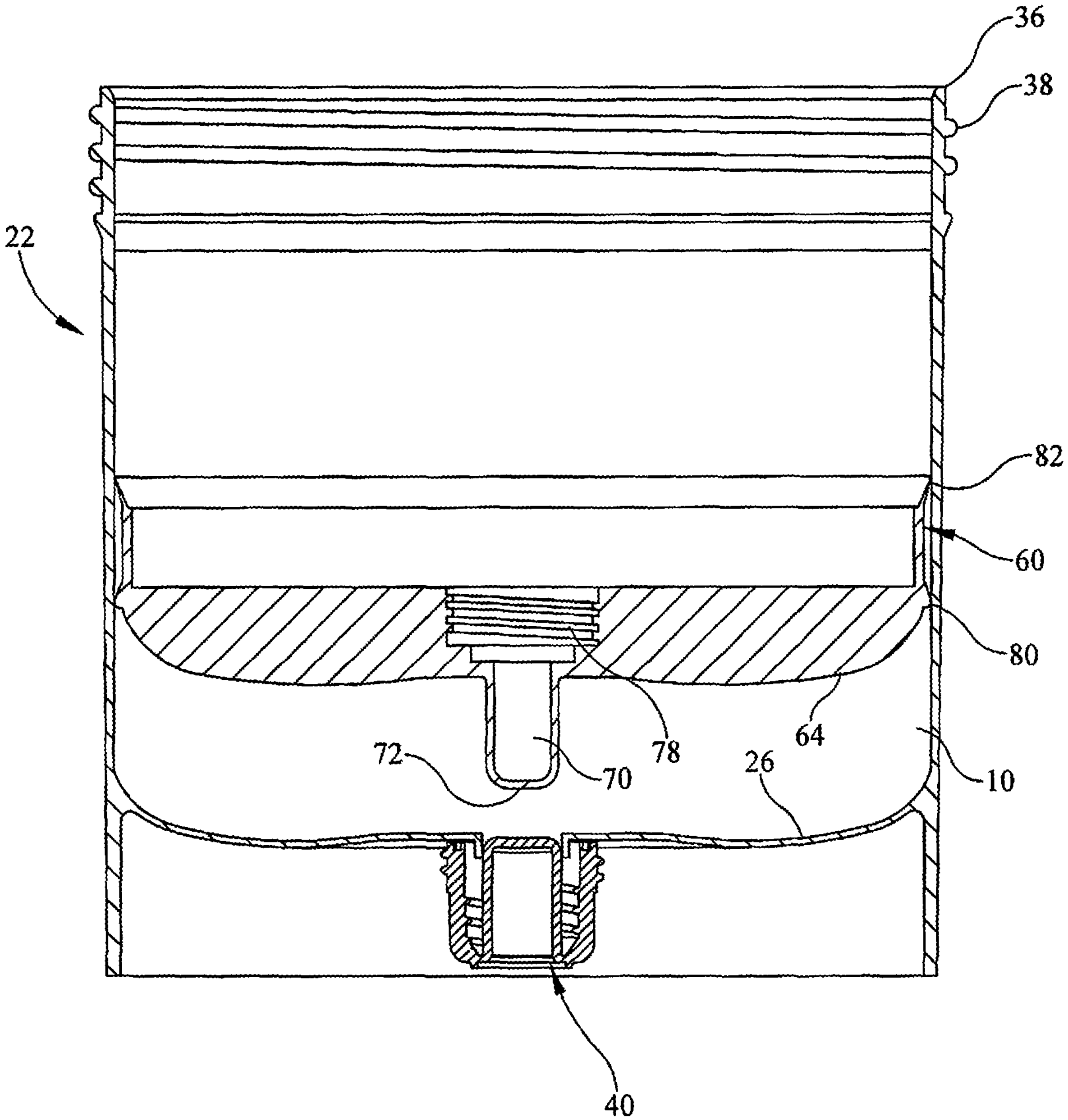
FIG. 17 is a side cutaway view of a cup and plunger showing the plunger in a fourth position, still farther inside the cup, and material in the cup, with substantially all the air expelled.

In exemplary embodiments, the lower sealing member 80 may be a ring-shaped protrusion extending outward from the plunger 60. The lower sealing member 80 may have an angled shape, as shown in FIG. 17, or may be rounded or other shape. In exemplary embodiments, the upper sealing member 82 may be a flap-type flange extending outward from the plunger 60 at an upward angle (as shown in FIG. 17). A solid-ring seal may provide for easy cleanability for reuse.

The plunger 60 has an external diameter (including the sealing members 80 and/or 82) similar to internal diameter of the cup 22, so that the plunger 60 slidingly but snugly fits at least partially within the cup 22, with the sealing member(s) 80, 82 making contact with the cup interior wall 28B so as to urge any material 10 clinging to the interior wall downward when the plunger 60 is urged downward in the cup 22 (as described further hereinbelow). In exemplary embodiments, the height of the plunger 60 is less than the height of the cup 22 so that the plunger 60 may fit entirely within the cup 22. In exemplary embodiments, the plunger 60 has one or more air vent holes 84 formed proximate to the port 70 (as shown in FIGS. 5-7 and 16). In exemplary embodiments, the air vent holes may be formed in the cup bottom 24 proximate to the port 70.

When in use, as further described hereinbelow, the plug 40 may be removably associated with the port 70 so as to seal the air vent holes 84.

Figure 10:
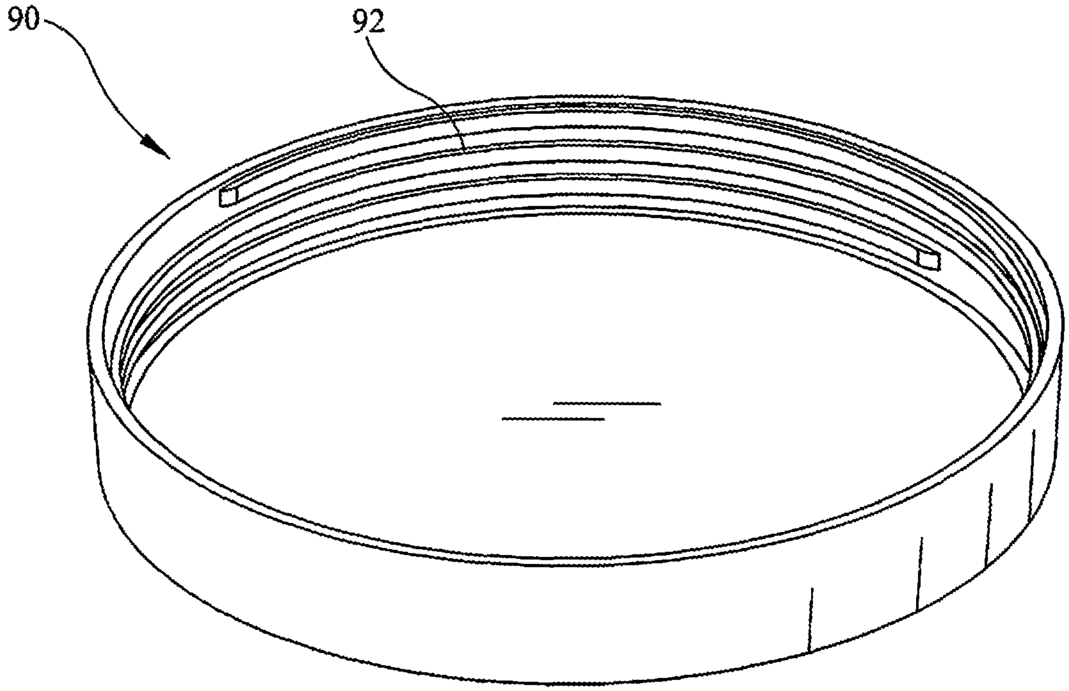
FIG. 10 is a bottom perspective view of a lid according to one exemplary embodiment.
Figure 11:
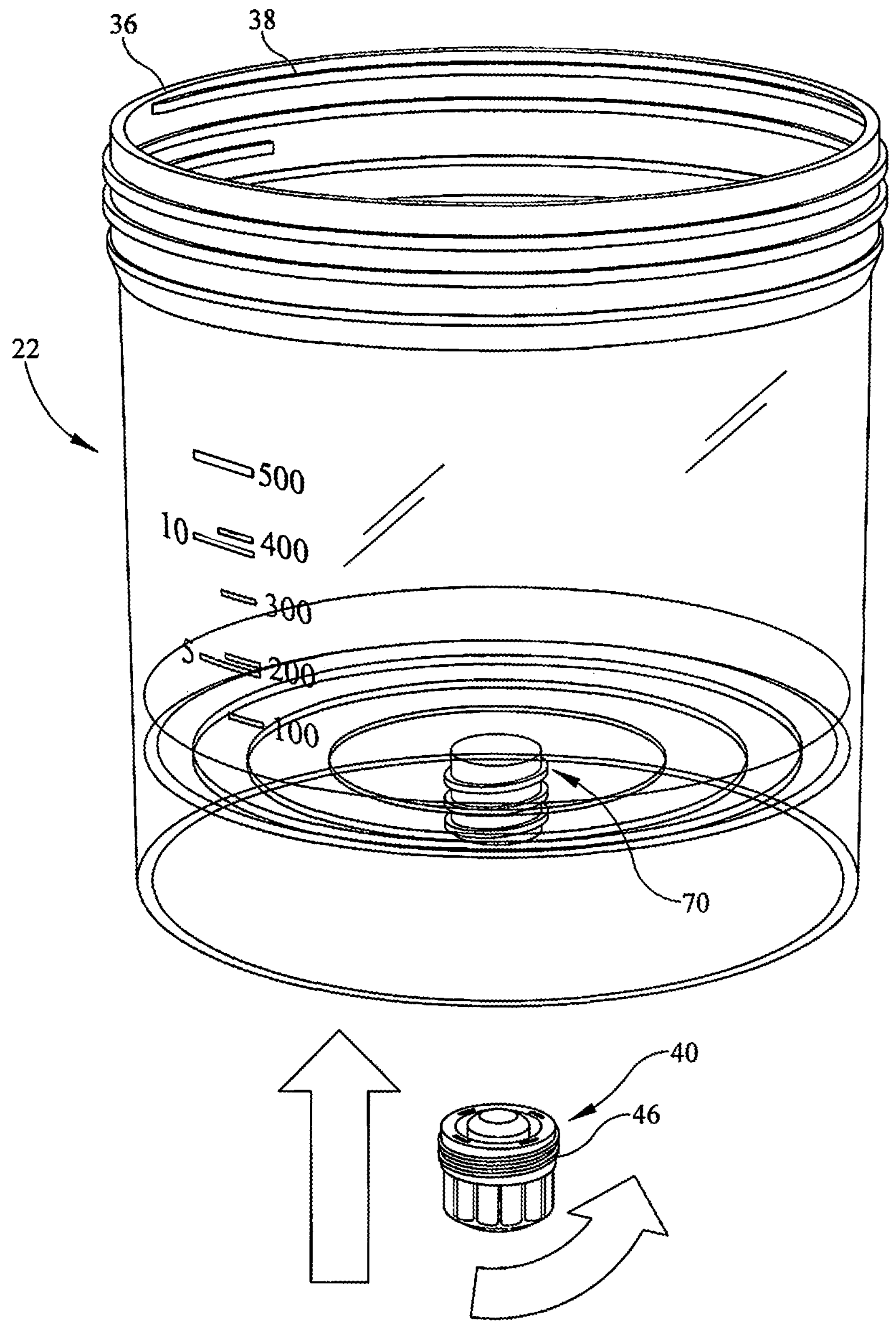
FIG. 11 is a perspective view of a cup and a plug.

In exemplary embodiments, a removable lid 90, as shown in FIGS. 2 and 10, is included. In exemplary embodiments, the lid 80 may have interior threads 92 which can be matingly threaded to the cup rim threads 38. Alternatively, instead of threads in the lid or cup rim, the lid 90 can be fitted over the cup 22 rim 36 a snap fit or a friction fit. Alternatively, the lid 80 may have threads on the external surface and can threadingly mate with threads on the internal surface of the cup 22.

Figure 9:
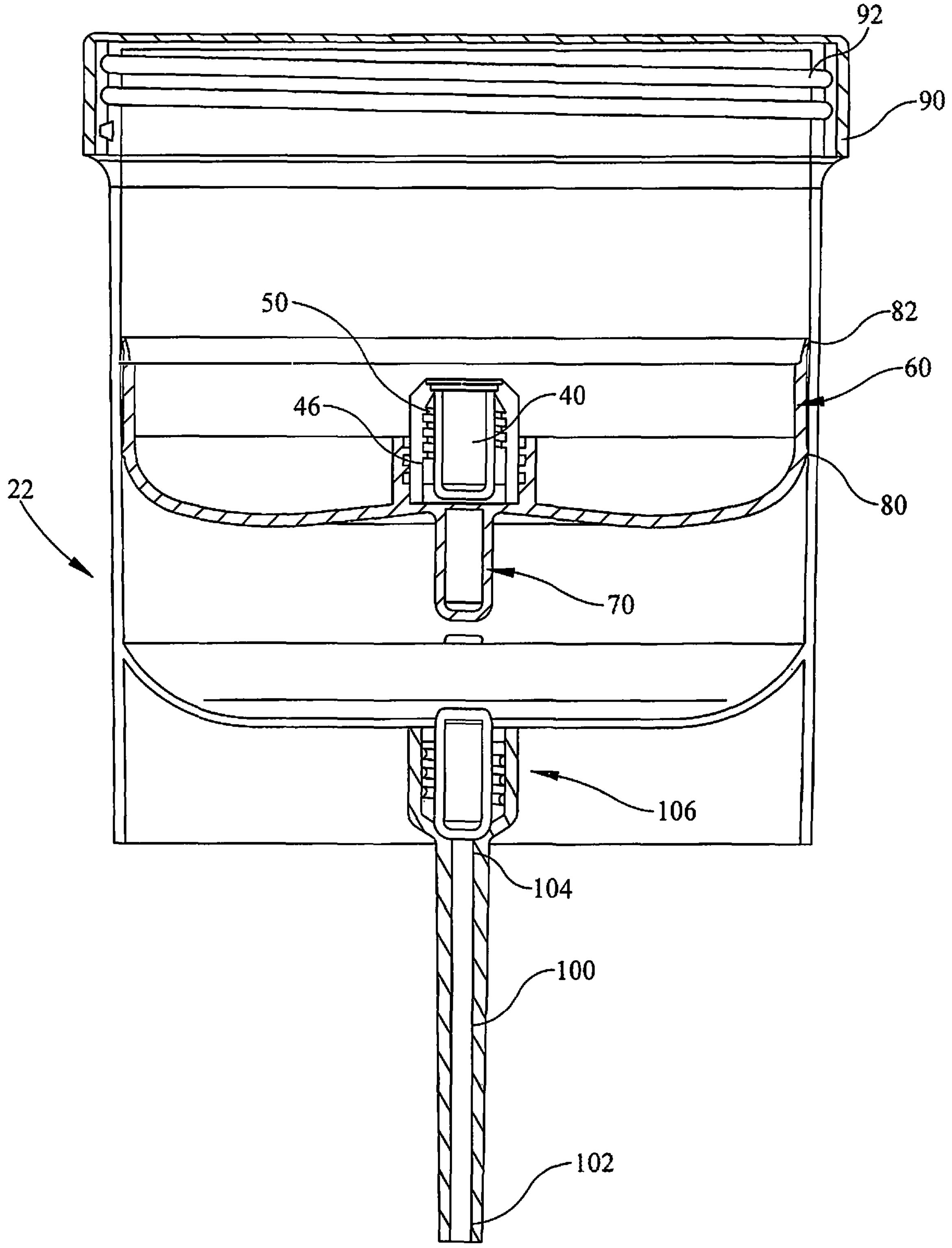
FIG. 9 is a side perspective view in partial cutaway of the view of FIG. 8, and showing the curved bottom of the plunger.
Figure 9A:
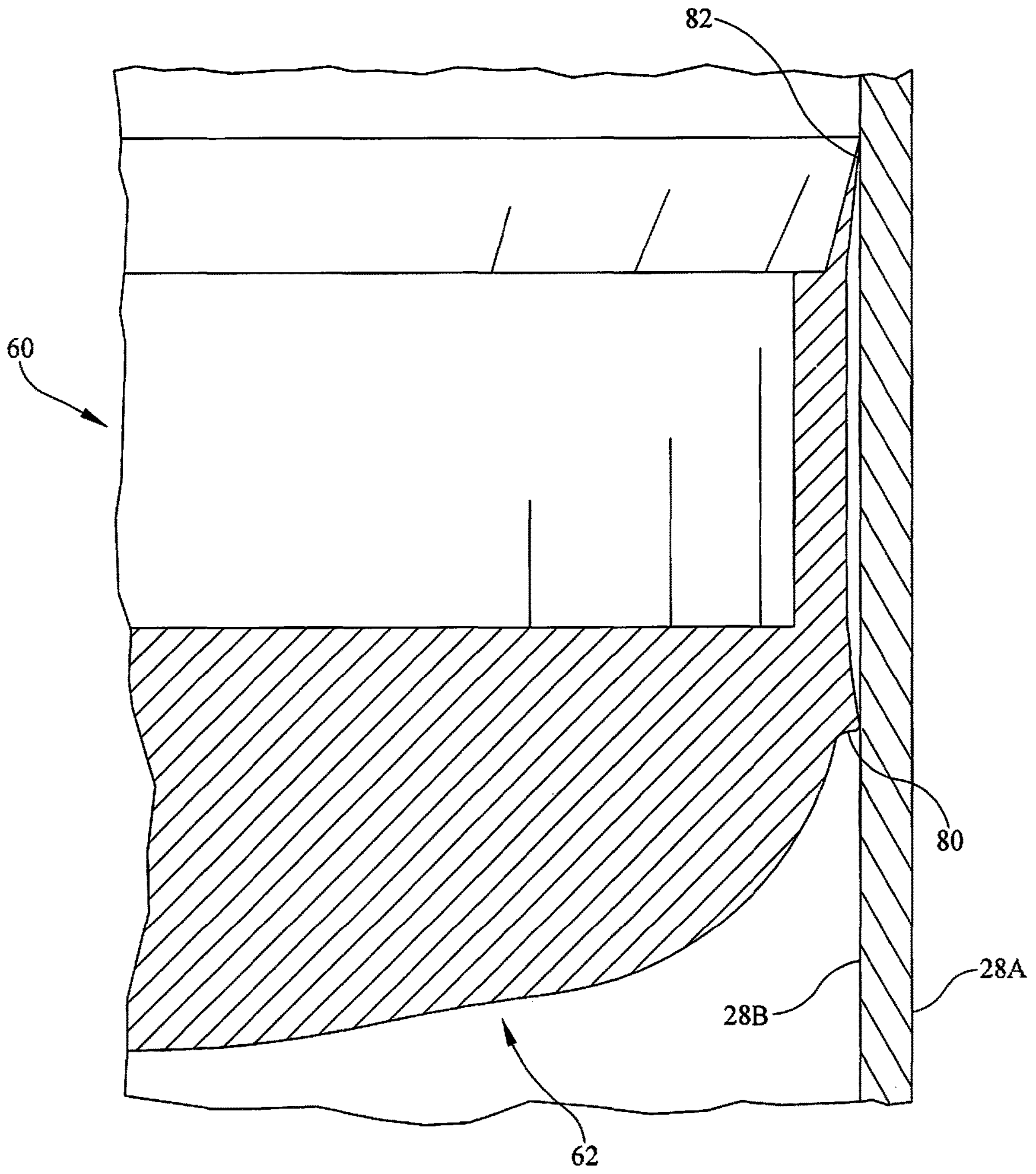
FIG. 9A is a partial side cutaway view of a detail of cup and plunger according to one exemplary embodiment, an upper sealing member being a flap-type flange and a lower sealing member being a ring-type flange.
Figure 20:
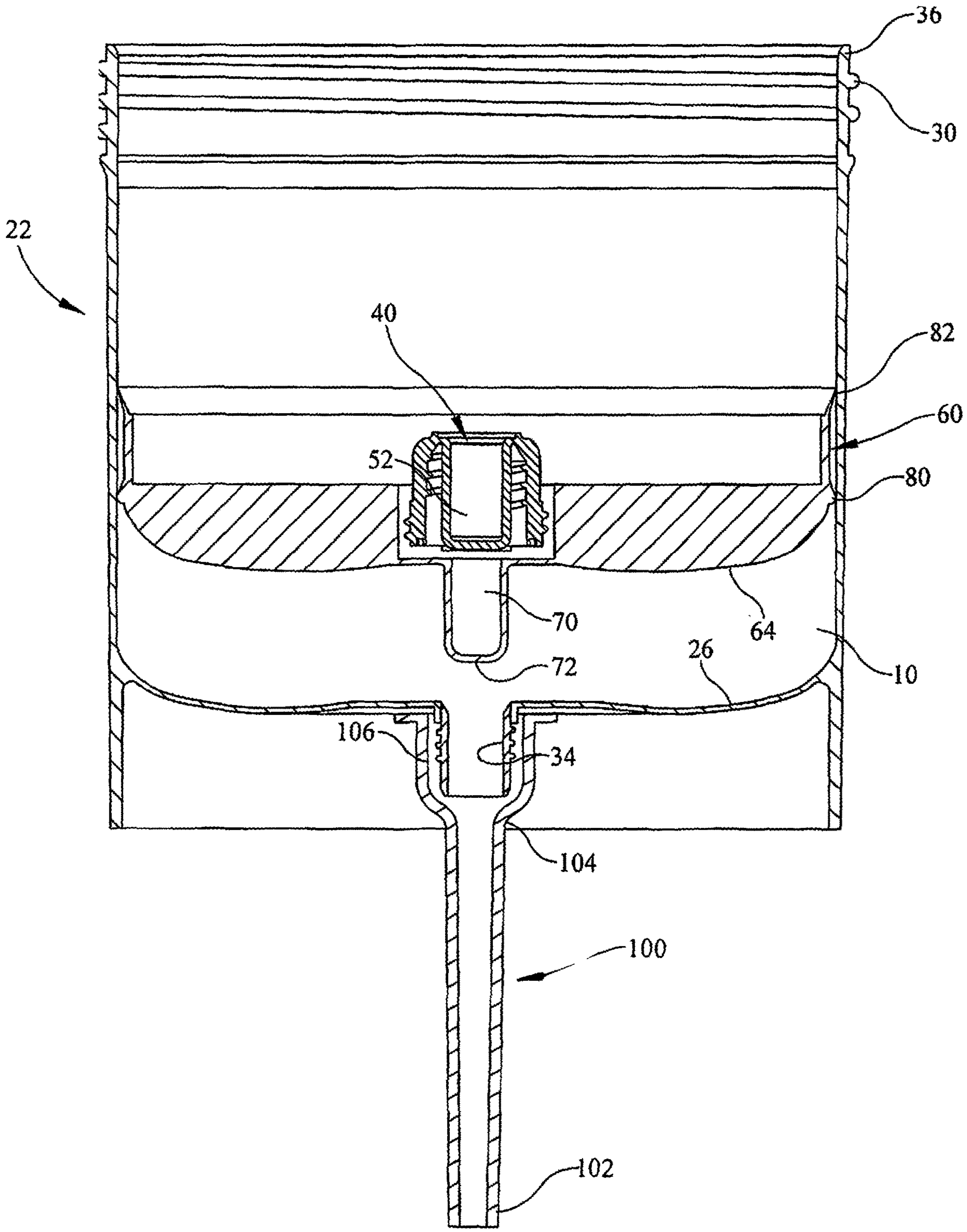
FIG. 20 is a side cutaway view of a cup and plunger, showing a nozzle attached to the cup bottom protrusion.

In exemplary embodiments, a hollow nozzle 100, as shown in FIGS. 2, 8, 9, and 20, has a distal tip end 102 and a proximal attachment end 104. In exemplary embodiments, a portion of the inner surface of the proximal end 104 has threads 106. The threads 106 can matingly engage the cup bottom protrusion threads 34, as shown in FIGS. 9 and 20. In an alternative exemplary embodiment, the nozzle may have Luer-lock type connection instead of threads that can mate with a complementary Luer-lock type connection (instead of threads) to the protrusion 30

In one exemplary embodiment, device may be assembled and used as follows. A pharmacist, technician, or other operator (or, apparatus, where an automated filler is used) inserts the plug 40 into the cup bottom protrusion 30 (FIG. 11) and secures it, such as by screwing the mating threads 34 and 50 together.

Figure 12:
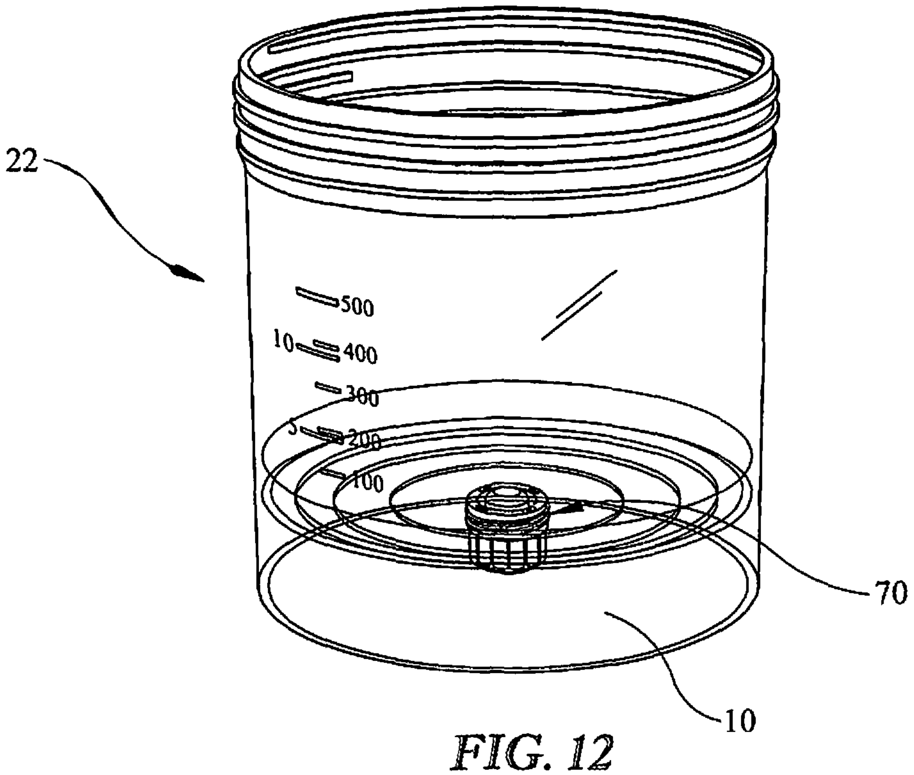
FIG. 12 is a perspective view of a cup with material disposed therein.
Figure 13:
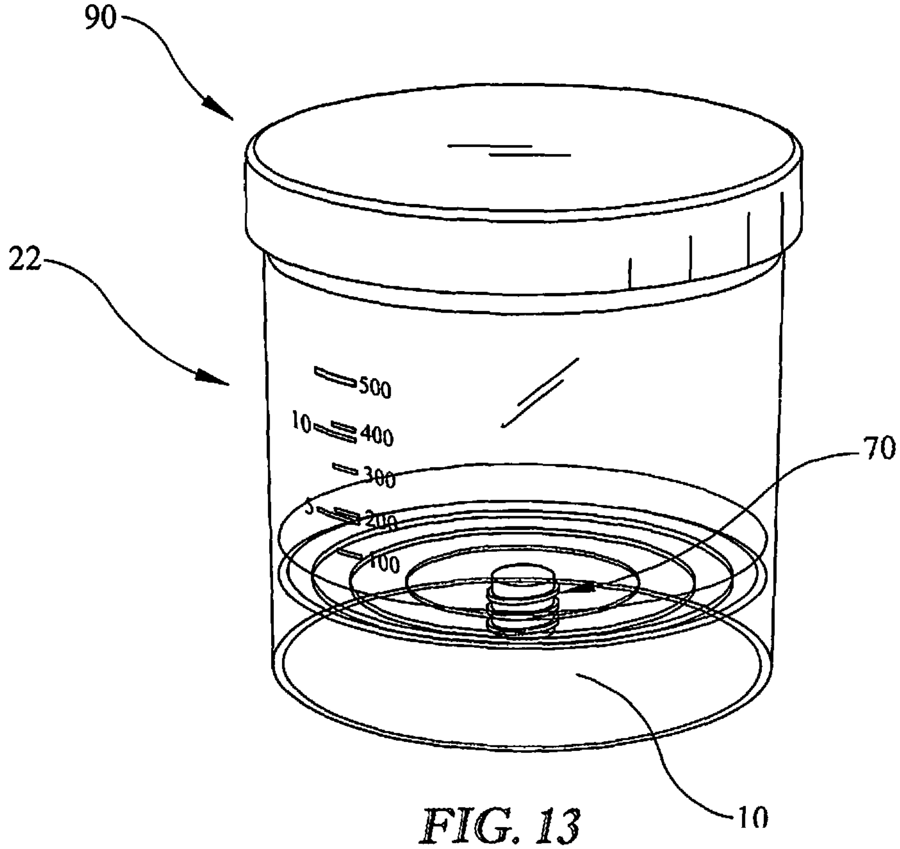
FIG. 13 is a perspective view of a cup fitted with a lid and with material disposed therein.

The cup 22 is then filled with the material 10, such as, but not limited to, a base material and an active ingredient (FIG. 12), and the lid 90 is securely fitted to the top of the cup 22, such as by screwing the mating threads 92 and 38 together (FIG. 13).

The filled cup 22 is then placed in the mixer 12 and the material is mixed. The cup 22 is then removed from the mixer 12.

Figure 14:
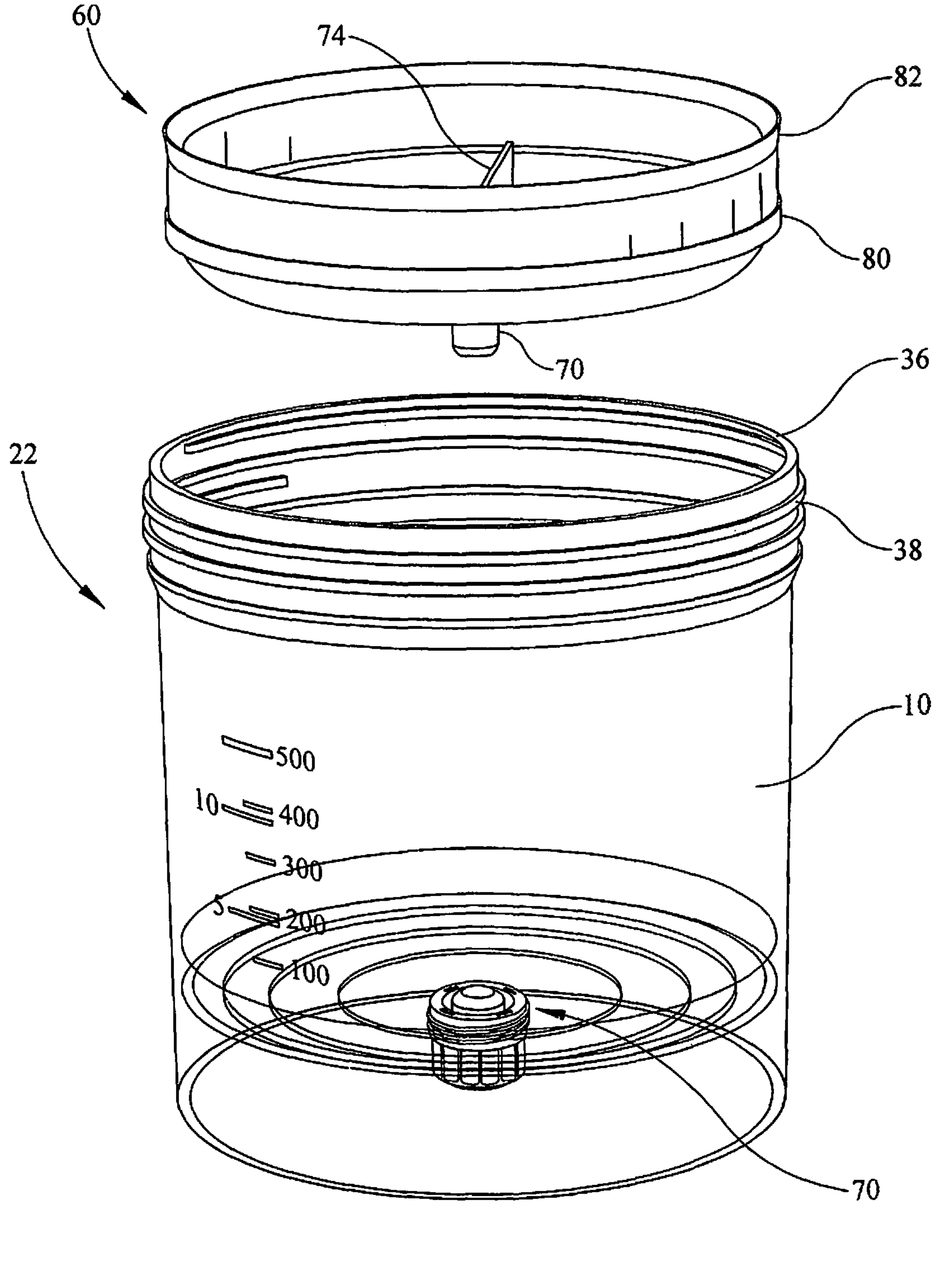
FIG. 14 is a perspective view of a cup with material disposed therein and showing a plunger in a first position for insertion into the cup.
Figure 15:
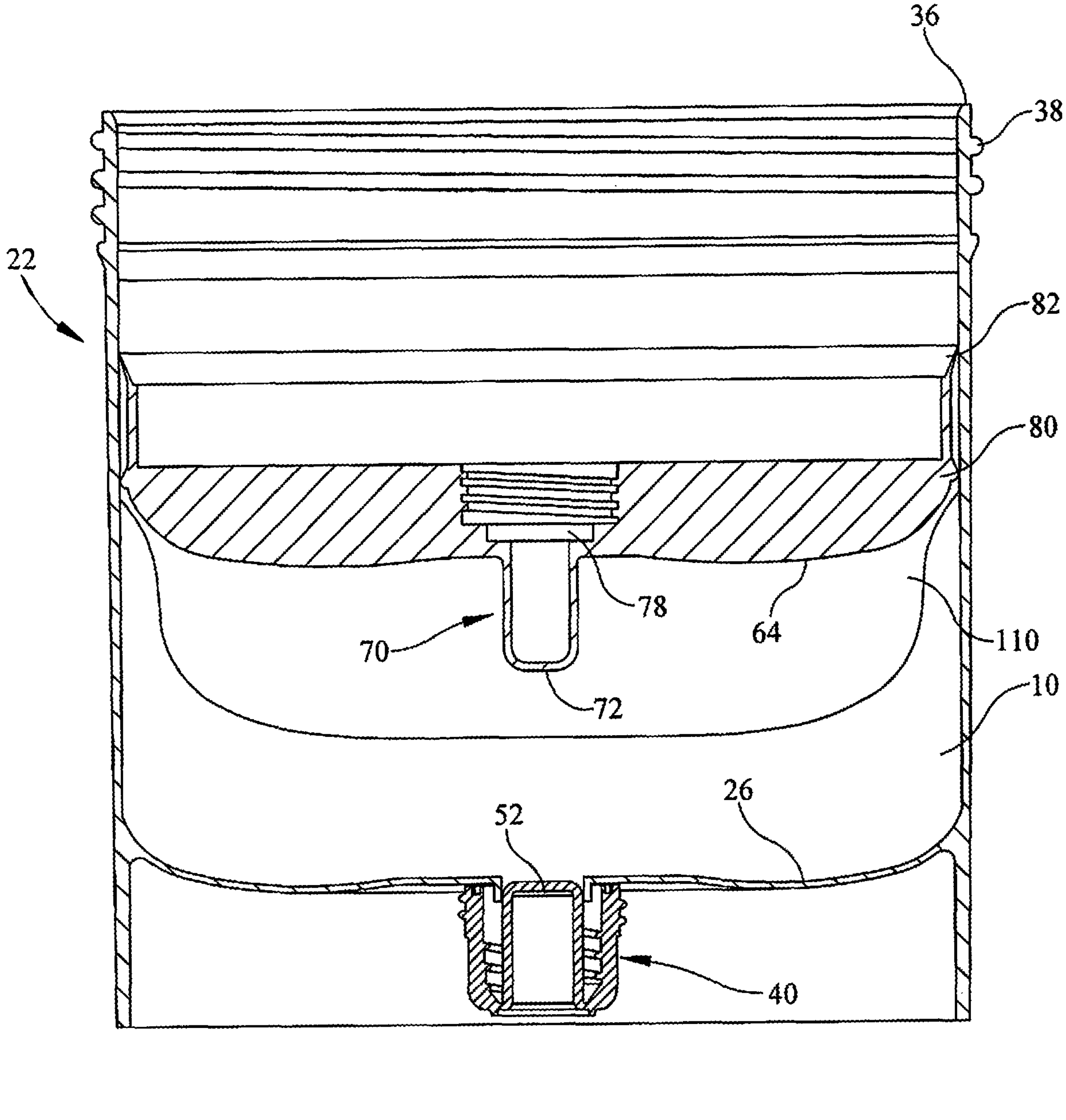
FIG. 15 is a side cutaway view of a cup and plunger showing the plunger in a second position inside the cup, and material (and air) in the cup.
Figure 16:
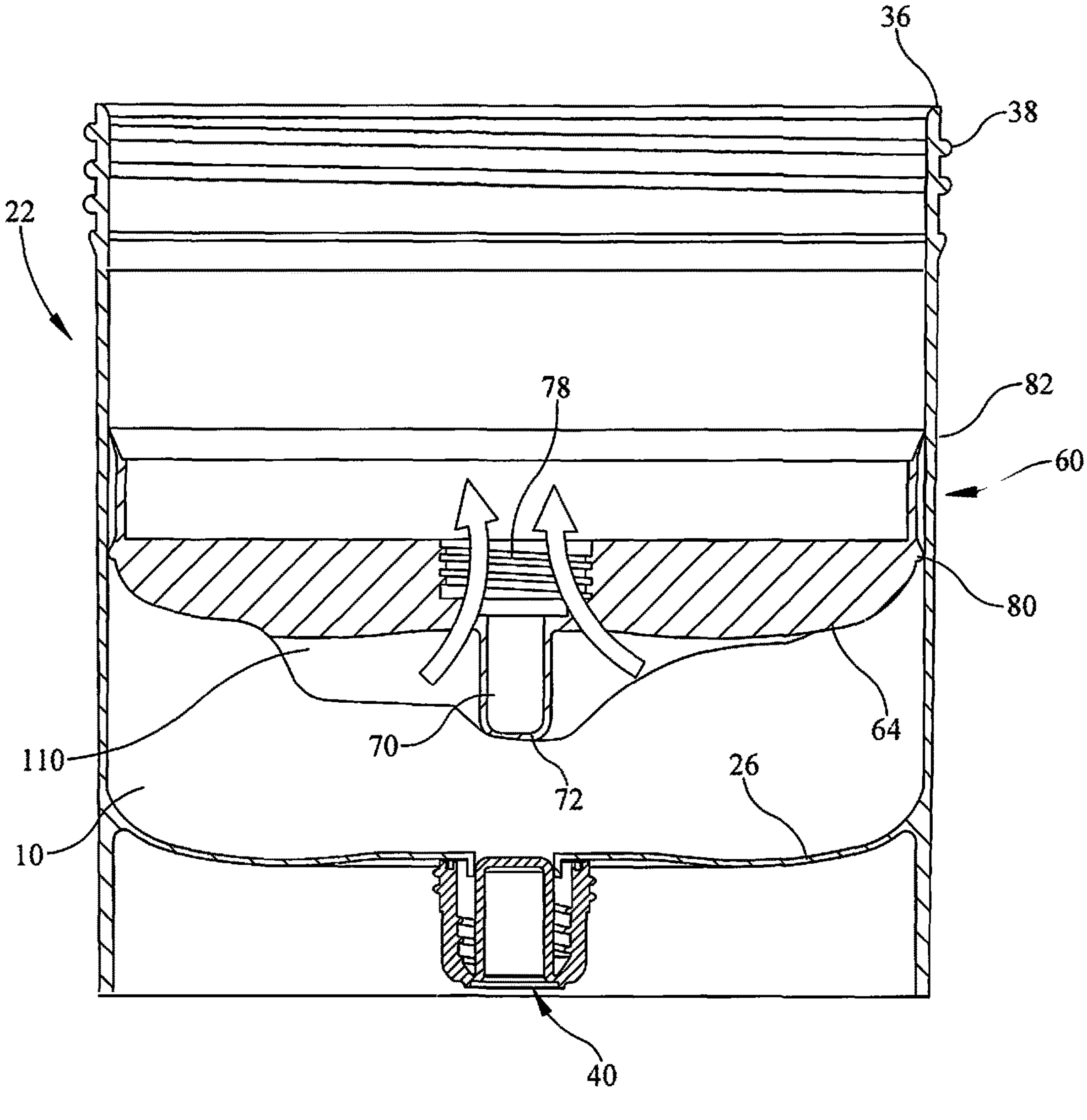
FIG. 16 is a side cutaway view of a cup and plunger showing the plunger in a third position, farther inside the cup, and material (and less air) in the cup.
Figure 19:
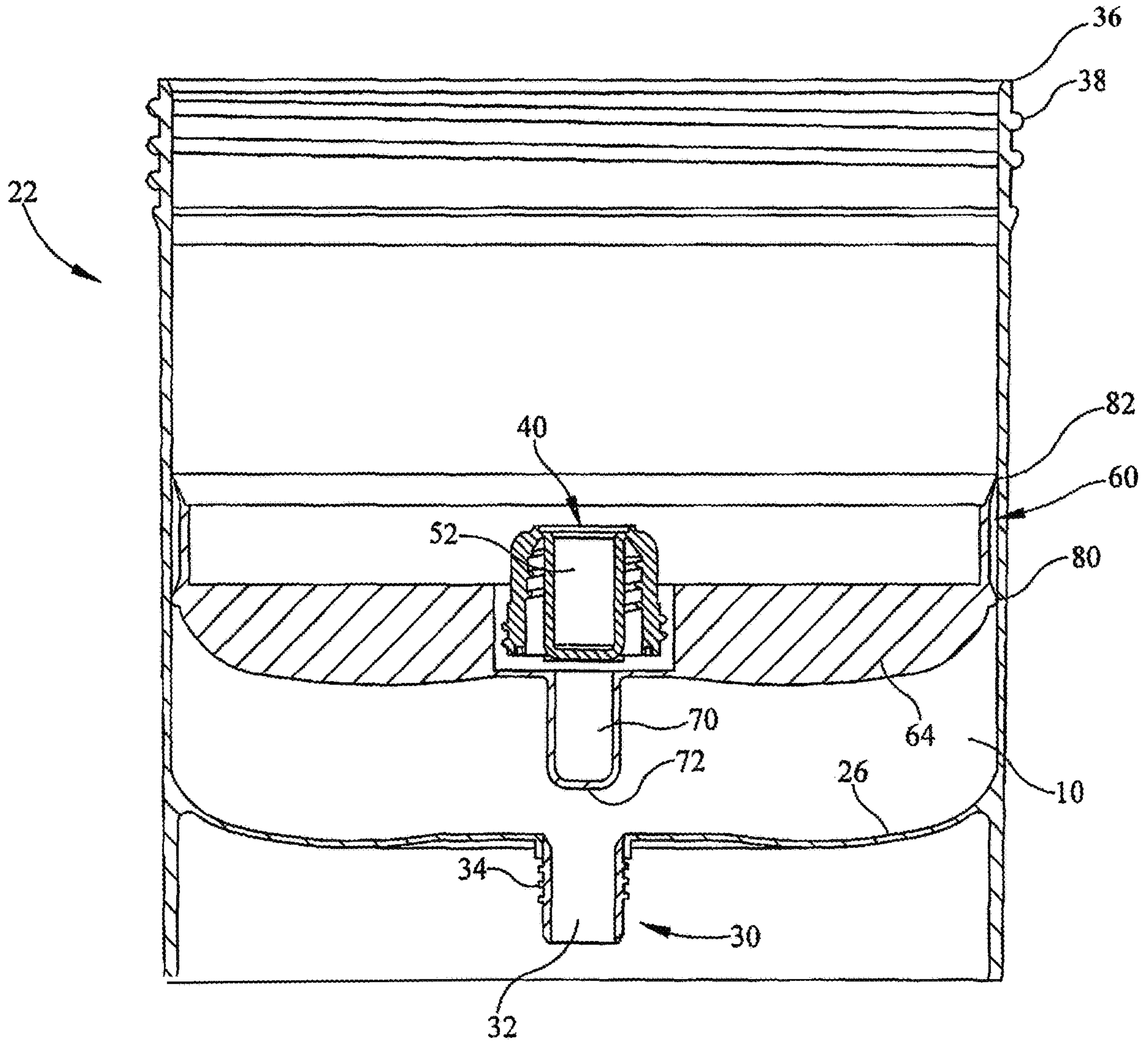
FIG. 19 is a side cutaway view of a cup and plunger, showing the plug inserted in the plunger port.

The cup 22 is readied for dispensing by unscrewing the lid 80 and inserting the plunger 60 into the cup 22, as shown in FIG. 14. Material 10 may have adhered to the wall 28B of the cup 22 during mixing, as shown in FIGS. 14-15. As the plunger 60 is urged downward (either manually or using an automated apparatus) in the cup 22, the sealing member 80, 82 (in embodiments where both are present, or, a single sealing member in other embodiments) push material 10 adhered to the walls downward so as to level the mixed material. As the plunger 60 is urged downward air 110 in the cup (between the surface of the material and the plunger face, as shown in FIGS. 15-16) escapes through the air vent holes 84 (as shown in FIG. 16 in the direction of arrows 85). The operator stops pressing on the plunger 60 when material 10 begins to flow through the vent holes 84, indicating that substantially all the air 110 has been removed (FIG. 17). The operator than removes the plug 40 from the cup bottom protrusion 30 (as shown in FIGS. 17-19) and fastens the plug 40 to the plunger port 70 so as to seal off the air vents 84 inside the plunger port (FIG. 18).

Figure 21:
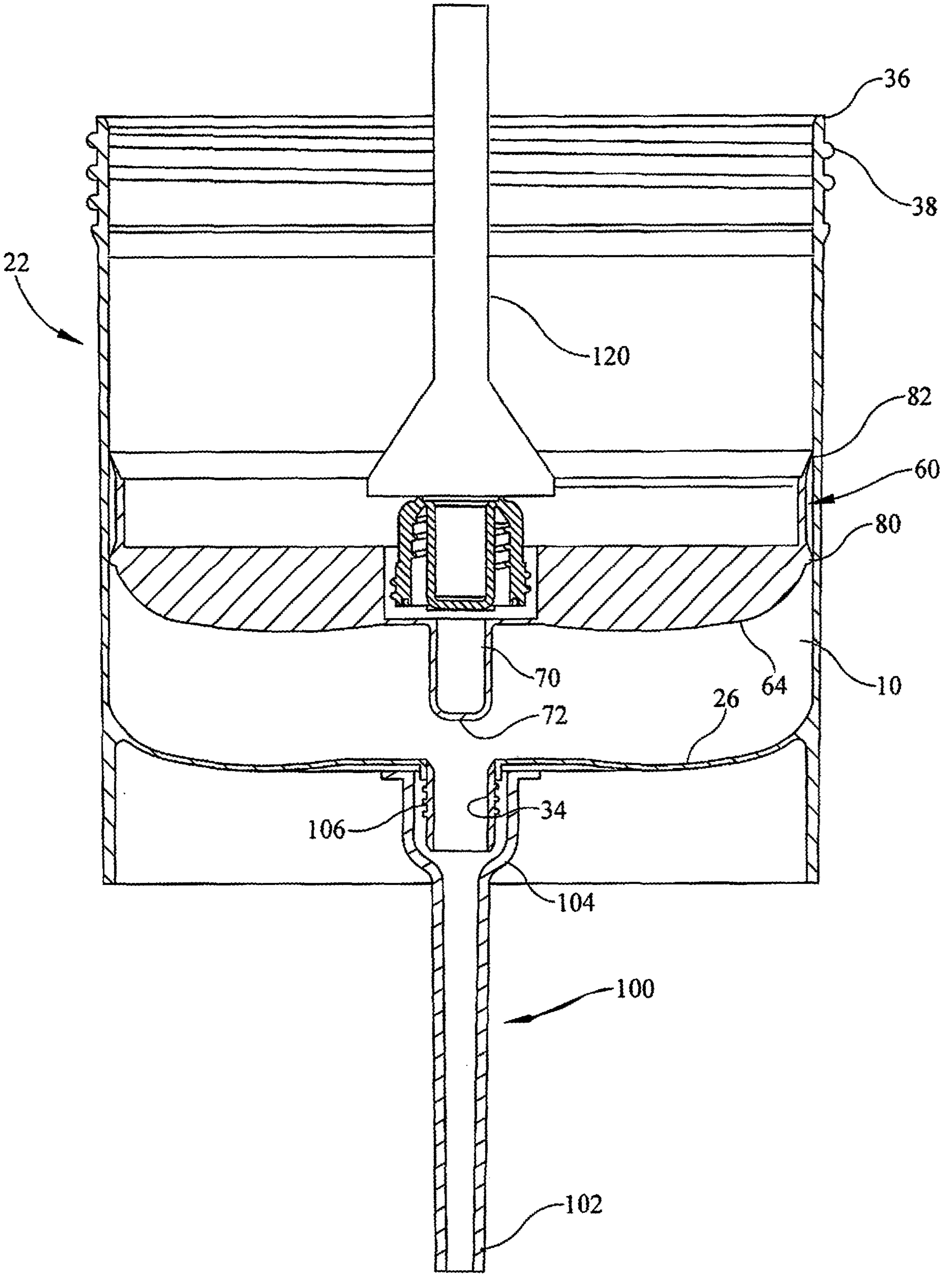
FIG. 21 is a side cutaway view of a cup and plunger, showing a rod engaged with the plunger.

The operator than fastens the nozzle 100 to the cup protrusion 30 (FIG. 20), and the material 10 is then ready for dispensing into patient-usable containers. In one exemplary embodiment, shown in FIG. 21, a rod 120 or other generally rigid member is urged downward against the plug 40 to urge the plunger 60 downward into the cup 22.

Figure 22:
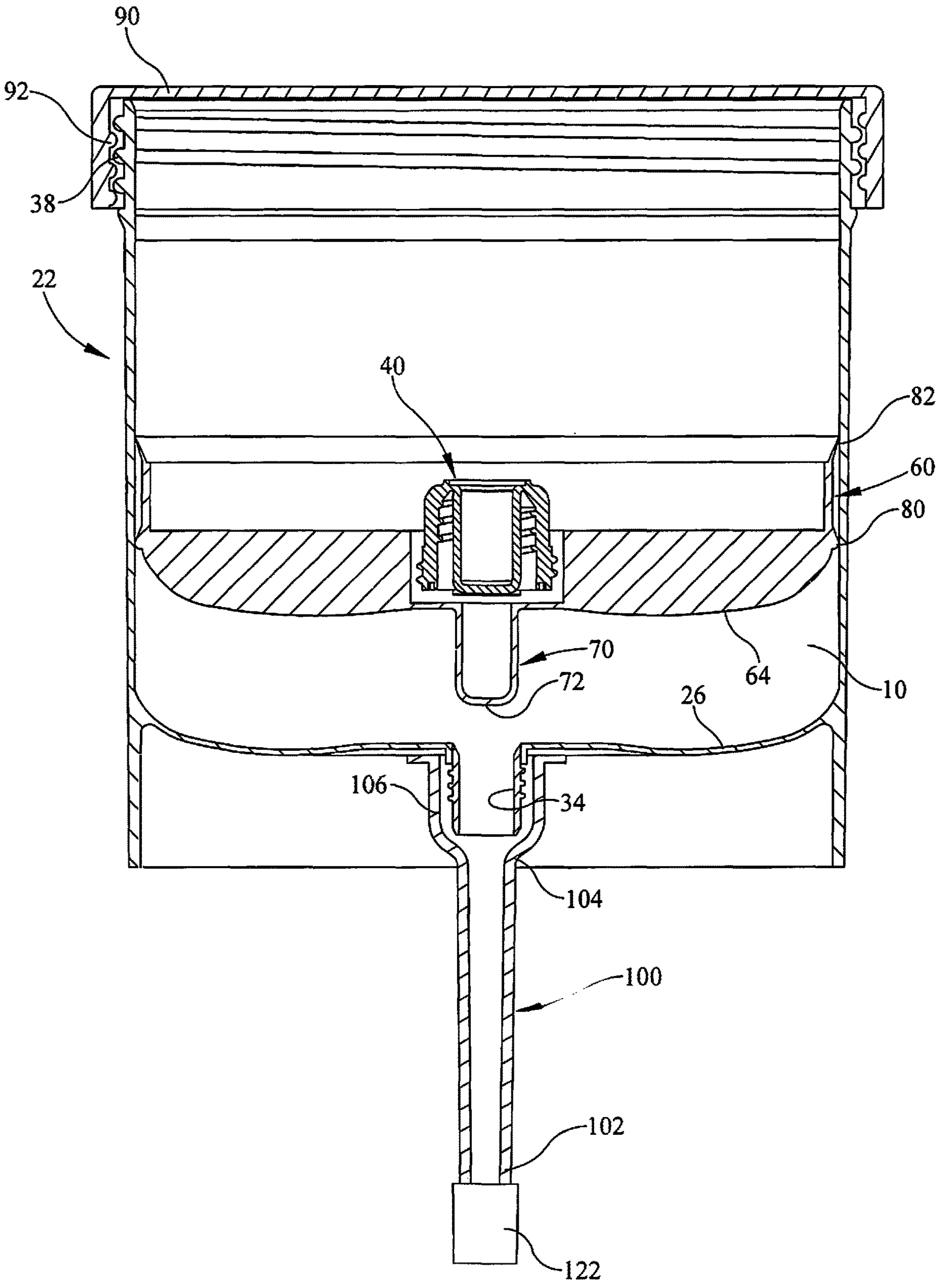
FIG. 22 is a side cutaway view of a cup and plunger, and further including a lid and a nozzle cap, according to one exemplary embodiment.

The operator can then replace the lid 90 on the cup 22 (FIG. 22) for storage of the cup 22 and undispensed material 10. In exemplary embodiments, an optional nozzle cap 122 may be fitted over the end of the nozzle 100 to prevent evaporation loss of material 10.

Figure 23:
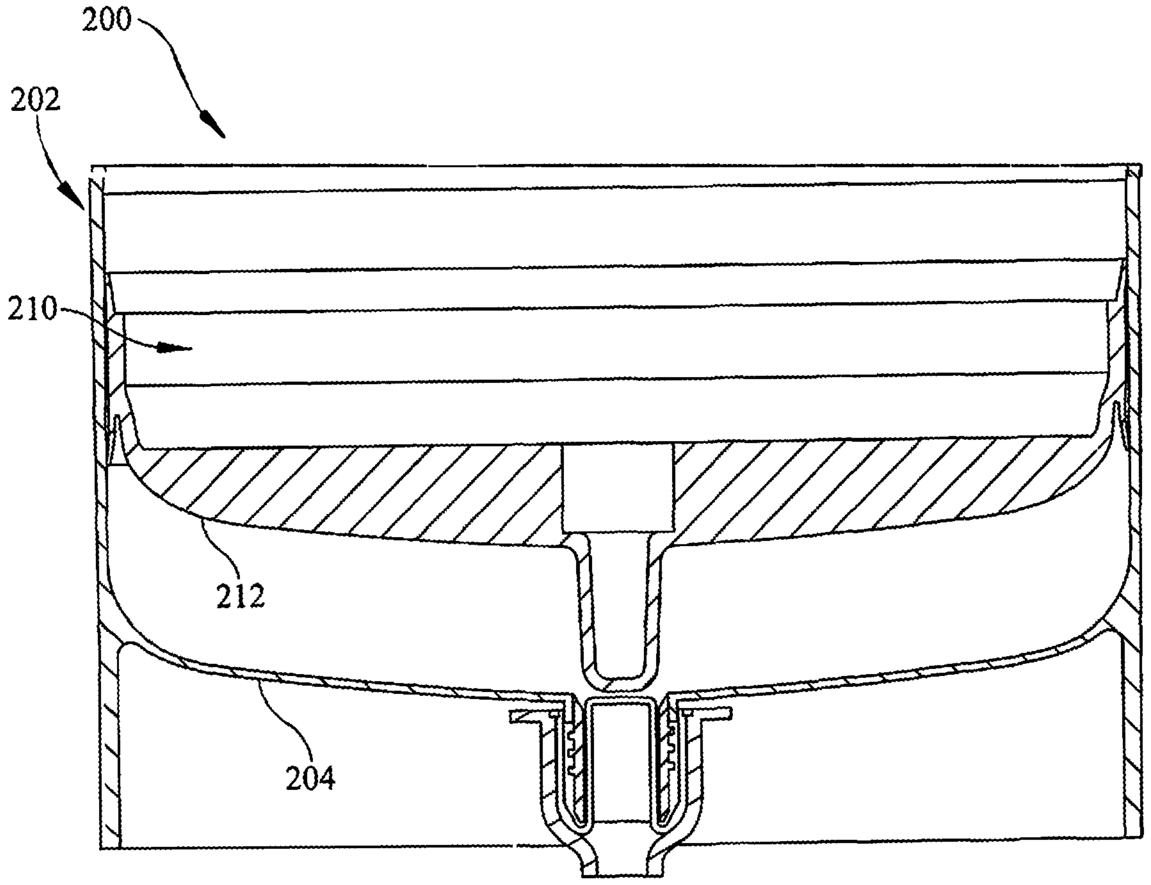
FIG. 23 is a side cutaway view of a cup and plunger according to one alternative exemplary embodiment, showing a curved cup bottom and mating curved plunger bottom.

In one alternative exemplary embodiment of a device 200, FIG. 23 shows a cup 202 having a curved bottom 204, and a plunger 210 is shown having a complementary curved bottom face 212.

Figure 24:
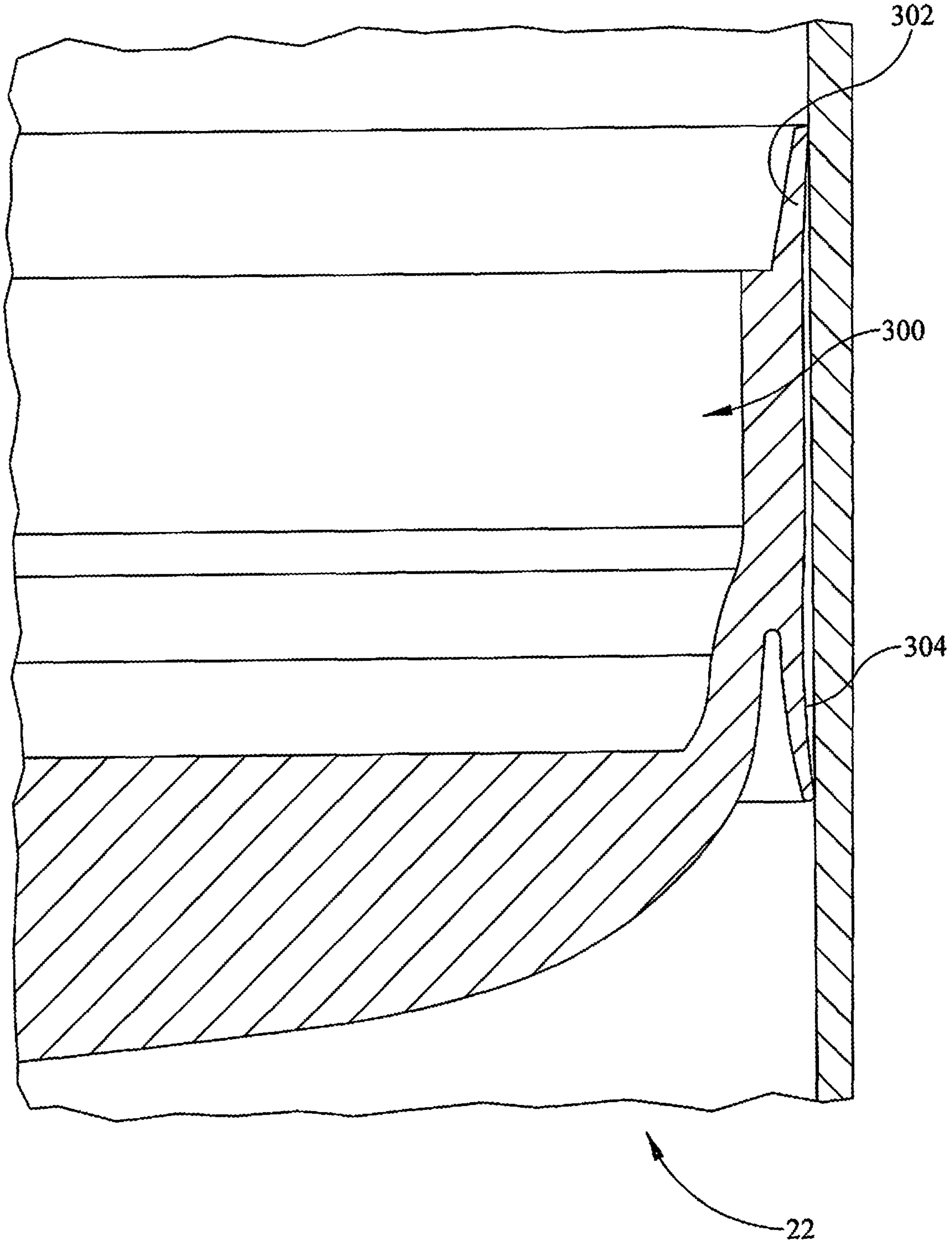
FIG. 24 is a partial side cutaway view of a cup and plunger according to one alternative exemplary embodiment, showing an upper sealing member and a lower sealing member, both being a flap-type flange.

In another exemplary embodiment of a plunger 300, the plunger sealing members, shown in FIG. 23-24, an upper sealing member 302 is a flap-type flange that is outwardly and upwardly angled. A lower sealing member 304 (which may be used with the upper sealing member, or without) also is a flap-type flange that is outwardly and downwardly angled.

A benefit of the interior and exterior sets of threads 50, 46 of the plug (in exemplary embodiments) is the plug 40 has a dual use, namely, to plug the cup 22 during mixing, and to plug the plunger 60 during dispensing. An advantage of the plunger port 70 is that it occupies volume in the cup protrusion 30, forcing material 10 into the nozzle 100 to reduce residual undispensed material.

An advantage of the presently described devices is that the same cup 22 can be used for mixing as well as delivering the mixed material 10 to the containers to be filled. This avoids transfer of the mixed material 10 from a mixing cup to a dispensing cup/container. The isolation of the mixed material 10 within the cup 22 and against the plunger 60 also avoids or reduces exposure of the mixed material 10 to air 110.

In one exemplary embodiment, an apparatus for mixing and dispensing a flowable material or mixture of materials is provided, the apparatus comprising a rotation mixer and a mixing cup. The rotation mixer may comprise a housing, a motor, a basket for holding in relative position a mixing cup containing material for mixing under asymmetric rotation, and, rotating means associated with the motor for rotating the basket at high speed so as to mix the material in the mixing cup. A mixing cup device may be according to one or more of the exemplary embodiments described hereinabove. In one exemplary embodiment, the mixing cup device comprises a generally cylindrical mixing cup having a bottom including a protrusion extending downward therefrom, the protrusion having an aperture defined therethrough. The device further includes a plunger comprising a bottom including a central port associated with the plunger bottom and having a threaded aperture defined therein, the plunger further comprising a sidewall having an exterior surface including at least one sealing member adapted to engage the cup. The device further includes a plug adapted to removably engage the cup protrusion and the plunger port. The device further includes a lid adapted to be removably engaged to the cup.

In another exemplary embodiment, an apparatus for mixing and dispensing a flowable material or mixture of materials is provided, the apparatus comprising a rotation mixer and a mixing cup. The rotation mixer may comprise a housing, a motor, a basket for holding in relative position a mixing cup containing material for mixing under asymmetric rotation, and, rotating means associated with the motor for rotating the basket at high speed so as to mix the material in the mixing cup. A mixing cup device comprises a generally cylindrical mixing cup having a first end including an aperture defined therethrough. The device further includes a plunger comprising a surface complimentary to the first end of the mixing cup, the plunger further comprising a sidewall having an exterior surface including at least one sealing member adapted to engage the cup.

In one exemplary embodiment, a method for mixing and dispensing a flowable material is provided, comprising providing a mixing apparatus as described hereinabove, and providing a mixing cup as described hereinabove. The plug is engaged with the mixing cup protrusion. Material to be mixed is added to the mixing cup. The cup is sealed with the lid. The mixing cup and lid is inserted into the basket in the mixer. The mixer is activated and the material in the mixing cup is rotated to mix the material to form a homogenous material mixture. The cup is removed from the mixer. The lid is removed from the mixing cup. The plunger is inserted into the mixing cup. The plug is disengaged from the mixing cup protrusion. The plug is engaged with the plunger port. The plunger is urged into the mixing cup so as to urge material in the cup toward the cup bottom and so as to cause air in the cup to evacuate through the at least one air vent hole. The nozzle is engaged with the cup protrusion. The plunger is urged toward the cup bottom so as to dispense the material mixture through the nozzle.

In another exemplary embodiment, a method for mixing and dispensing a flowable material is provided, comprising providing a mixing apparatus comprising a rotation mixer comprising a housing, a motor, a basket for holding in relative position a mixing cup containing material for mixing under asymmetric rotation, and rotating means associated with the motor for rotating the basket at high speed so as to mix the material in the mixing cup. A mixing cup is provided, comprising a generally cylindrical mixing cup having a first end including an aperture defined therethrough, a plunger comprising a surface complimentary to the first end of the mixing cup, the plunger further comprising a sidewall having an exterior surface including at least one sealing member adapted to engage the cup, and, a nozzle adapted to be removably engaged to the cup aperture. Material to be mixed is added to the mixing cup. The mixing cup and lid is inserted into the basket in the mixer. The mixer is activated and the material in the mixing cup is rotated to mix the material to form a homogenous material mixture. The cup is removed from the mixer. The nozzle is engaged with the cup protrusion. The plunger is urged toward the first end of the cup so as to dispense the material mixture through the nozzle.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

While the methods, equipment and systems have been described in connection with specific embodiments, it is not intended that the scope be limited to the particular embodiments set forth, as the embodiments herein are intended in all respects to be exemplary rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

As used in the specification and the appended claims, the singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

What is claimed is:

1. A device for mixing and dispensing a flowable material comprising:

- a mixing cup having a protrusion extending from the cup, said protrusion including an aperture;
- a plunger comprising at least one port having an opening adapted to allow air from the internal portion of the cup to flow outward when said plunger is depressed, and a sealing member adapted to engage the sidewall of the cup;
- one or more plugs adapted to removably engage the cup protrusion or the plunger port; and
- a hollow nozzle, the nozzle having a proximal end having internal threads adapted to engage with the plunger port.

2. The device of claim 1, wherein said mixing cup comprises an interior bottom surface that extends beyond the terminal portions of said protrusion, or said plug when secured to said protrusion whereby the mixing cup can be positioned approximately flush with a flat surface.

3. The device of claim 1, wherein said sealing member comprises an upper sealing member portion adapted to engage the mixing cup sidewall, and a lower sealing member portion adapted to engage the mixing cup sidewall.

4. The device of claim 1, wherein said one or more plugs comprises a plug having an outer cylindrical portion having an exterior wall including threads, an interior wall including threads, and a central plugging member, the plug adapted to removably engage either the mixing cup protrusion or the plunger port.

5. The device of claim 1, and therefore comprising a cap adapted to removably fit over the distal end of the nozzle, or the cup protrusions, or the port.

6. The device of claim 1, and further comprising a lid adapted to removably engage the mixing cup rim.

7. A system for mixing and dispensing a flowable material comprising:

- a rotation mixer having a basket for holding in relative position a mixing cup containing material for mixing under asymmetric rotation, wherein said mixing cup comprises a protrusion extending from the cup;
- a plunger having at least one port and at least one sealing member adapted to engage the sidewall of the cup, wherein said port includes an opening adapted to allow air from the internal portion of the cup to flow outward when said plunger is depressed, said wherein said protrusion includes an aperture adapted to allow material from the internal portion of the cup to flow outward when said plunger is depressed; and
- one or more plugs adapted to removably engage the cup protrusion or the plunger port, wherein said one or more plugs comprises a plug having an outer cylindrical portion having an exterior wall including threads, an interior wall including threads, and a central plugging member, the plug adapted to removably engage either the mixing cup protrusion or the plunger port.

8. The system of claim 7, wherein said mixing cup comprises an interior bottom surface that extends beyond the terminal portions of said protrusion, or said plug when secured to said protrusion whereby the mixing cup can be positioned approximately flush with a flat surface.

9. The system of claim 7, wherein said sealing member comprises an upper sealing member portion adapted to engage the mixing cup sidewall, and a lower sealing member portion adapted to engage the mixing cup sidewall.

10. The system of claim 7, and further comprising a hollow nozzle, the nozzle having a proximal end having internal threads adapted to engage with the plunger port.

11. The system of claim 10, and further comprising a cap adapted to removably fit over the distal end of the nozzle, or the cup protrusion, or the port.

12. The system of claim 7, and further comprising a lid adapted to removably engage the mixing cup rim.

13. A system for mixing and dispensing a flowable material or mixture of materials, the device comprising:

- a mixing cup having a protrusion extending from the cup, said protrusion including an aperture;
- a plunger adapted to fit at least partially within the mixing cup, the plunger comprising:
  - a central port associated with the plunger bottom and having a threaded aperture defined therein,
  - at least one air vent hole defined in the port;
  - at least one sealing member adapted to engage the sidewall of the cup;
- one or more plugs adapted to removably engage the cup protrusion or the plunger port; and
- wherein said mixing cup comprises an interior bottom surface that extends beyond the terminal portions of said protrusion, or said plug when secured to said protrusion whereby the mixing cup can be positioned approximately flush with a flat surface.

14. The device of claim 13, wherein said sealing member comprises an upper sealing member portion adapted to engage the mixing cup sidewall, and a lower sealing member portion adapted to engage the mixing cup sidewall.

15. The device of claim 13, wherein said one or more plugs comprises a plug having an outer cylindrical portion having an exterior wall including threads, an interior wall including threads, and a central plugging member, the plug adapted to removably engage either the mixing cup protrusion or the plunger port.

16. The device of claim 13, and further comprising a hollow nozzle, the nozzle having a proximal end having internal threads adapted to engage with the plunger port.

17. The device of claim 16, and further comprising a cap adapted to removably fit over the distal end of the nozzle.

18. The device of claim 13, and further comprising a lid adapted to removably engage the mixing cup rim.

* * * * *